United States Patent
Liu

(10) Patent No.: US 10,502,218 B2
(45) Date of Patent: Dec. 10, 2019

(54) AIR PUMP CONTROL SYSTEM AND METHOD

(71) Applicant: Bestway Inflatables & Material Corp., Shanghai (CN)

(72) Inventor: Feng Liu, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 371 days.

(21) Appl. No.: 15/269,350

(22) Filed: Sep. 19, 2016

(65) Prior Publication Data

US 2017/0130728 A1    May 11, 2017

(30) Foreign Application Priority Data

Nov. 11, 2015  (CN) .......................... 2015 1 0766707

(51) Int. Cl.
| | |
|---|---|
| F04D 27/00 | (2006.01) |
| F04B 49/02 | (2006.01) |
| G05D 16/20 | (2006.01) |
| F04D 25/08 | (2006.01) |

(52) U.S. Cl.
CPC .......... *F04D 27/007* (2013.01); *F04B 49/022* (2013.01); *F04D 25/084* (2013.01); *F04D 27/008* (2013.01); *G05D 16/2066* (2013.01)

(58) Field of Classification Search
CPC .... F04D 27/007; F04D 27/008; F04B 49/022; G05D 16/2066
See application file for complete search history.

(56) References Cited

U.S. PATENT DOCUMENTS

| | | | | |
|---|---|---|---|---|
| 4,803,744 | A * | 2/1989 | Peck ..................... | A61B 5/1115 5/706 |
| 5,694,987 | A * | 12/1997 | Marchant .............. | B29C 73/166 141/38 |
| 7,398,803 | B2 * | 7/2008 | Newton ................ | A61H 9/0078 141/10 |
| 8,413,278 | B2 * | 4/2013 | Chaffee ................ | G05D 16/208 141/95 |

(Continued)

FOREIGN PATENT DOCUMENTS

| | | |
|---|---|---|
| CN | 101879845 A | 11/2010 |
| CN | 103775821 A | 5/2014 |

(Continued)

*Primary Examiner* — Timothy L Maust
(74) *Attorney, Agent, or Firm* — AJ Moss; Dickinson Wright PLLC

(57) ABSTRACT

An air pump control system includes an air pump for inflating or deflating an inflatable body; a switching driving device connected to the air pump for driving the switching between two or more air passages; and an air pressure sensor for detecting an internal air pressure value of the inflatable body, and sending an internal pressure signal to a central control unit, which is connected to the air pump, the switching driving device, and the air pressure sensor. The central control unit sends a driving signal to the switching driving device to activate the switching between the air passages, and sends an activation or deactivation signal to the air pump according to the detected internal air pressure value and a pre-set inflating air pressure value, to control the activation or deactivation of the air pump. An air pump control method adapted to the above air pump control system is provided.

28 Claims, 7 Drawing Sheets

(56) References Cited

U.S. PATENT DOCUMENTS

| | | | | |
|---|---|---|---|---|
| 9,157,433 B2* | 10/2015 | Wang | ............... | F04B 49/022 |
| 10,173,483 B2* | 1/2019 | Neir | ............... | B60C 29/068 |
| 10,238,560 B2* | 3/2019 | O'Keefe | ............ | A61G 7/05784 |
| 2008/0172789 A1* | 7/2008 | Elliot | ............... | G06F 19/00 |
| | | | | 5/616 |
| 2011/0020149 A1* | 1/2011 | Tsai | ............... | A47C 27/082 |
| | | | | 417/321 |

FOREIGN PATENT DOCUMENTS

| | | |
|---|---|---|
| CN | 103786677 A | 5/2014 |
| CN | 203835691 A | 9/2014 |
| CN | 204065811 U | 12/2014 |
| CN | 204170251 U | 2/2015 |
| CN | 104476987 A | 4/2015 |
| CN | 204610218 U | 9/2015 |
| CN | 205207134 U | 5/2016 |
| EP | 3059451 A1 | 8/2016 |
| JP | 2000-002187 A | 1/2000 |
| JP | 4040848 B2 | 1/2008 |

\* cited by examiner

AIR PUMP CONTROL SYSTEM AND METHOD

TECHNICAL FIELD

The present invention relates to air pump control technology, particularly to an air pump control system and method.

BACKGROUND ART

Commercially available inflatable products, such as inflatable beds, inflatable mattresses, inflatable boats, and inflatable toys, are widely favoured by consumers, have an extremely wide range of applications, have become one of necessary products for people at home and on travel, and have a very great potential in the markets, thanks to the advantages of being light in weight, foldable, easy to carry, comfort and so on.

An air pump is one of the necessary components for inflatable products; for some of the inflatable products, a manual inflation pump, or a hand-held electric air pump is adopted to inflate the inflatable products via an air valve provided thereon; for some of the inflatable products, such as inflatable beds and inflatable mattresses, a built-in electric pump mounted on the inflatable bed and inflatable mattress is used for inflation; a user manually turns on or off a switch of the electric pump to control the starting up and shutting down thereof, and in comparison with the manual inflation pump and hand-held electric air pump, the built-in electric air pump is more convenient to use and has a faster inflation speed.

When an inflatable product is inflated, whether the inflatable body can be inflated to a proper pressure value has a direct influence on both the improvement of user's experience and the prolonging of the service life of the inflatable product; taking an inflatable mattress for example, insufficient inflation pressure will cause the mattress to be softer and to have an insufficient support force, while if the inflation pressure is too high, the inflatable mattress would expand and deform, and would be easy to break. In the absence of a barometer, the control of inflation pressure can only be achieved by pressing the inflatable product to sense the pressure therein while inflating, and this method of controlling the inflation pressure is neither convenient nor accurate, and has an extended inflation time.

Currently, inflatable products such as inflatable mattresses often adopt thermoplastic rubberized fabric, and a certain degree of expansion and deformation of the inflatable product would occur after it is inflated, leading to the attenuation of the internal air pressure value of the inflatable product, so that it is difficult to maintain the inflatable product within a relatively constant pressure range for a long time; moreover, the manual inflation pump, the hand-held electric air pump and the built-in electric pump in the prior art cannot automatically supplement air to the inflatable product in order to restore the same to the appropriate pressure value, and the user has to manually inflate the inflatable product repeatedly, which results in inconvenience for the user.

SUMMARY OF THE INVENTION

In view of the aforementioned defects and shortcomings, there is a need to provide a novel control system and method to mitigate these problems. The present invention provides a new air pump control system and method herein, which are intended to determine the subsequent operation according to the internal air pressure value of the inflatable body, in order to avoid the problems such as over-inflation and ineffective deflate, and to keep the internal air pressure value of the inflatable body relatively stable for a long time while reducing power consumption by further providing an air supplementing pump dedicated to air supplementing operation in addition to the primary air pump.

According to a first aspect of the present invention, an air pump control system is provided, comprising:

an air pump for inflating or deflating an inflatable body;

a switching driving device connected to said air pump and adapted to drive the switching between two or more air passages; and an air pressure sensor, which is used for detecting an internal air pressure value of said inflatable body, and adapted to generate an internal pressure signal associated with said internal air pressure value and send the same to a central control unit, wherein said central control unit is connected to said air pump, switching driving device and air pressure sensor, and said central control unit is adapted to send a driving signal to drive said switching driving device to activate the switching between said air passages, and to send an activation signal or a deactivation signal to said air pump according to the internal air pressure value of said inflatable body detected by said air pressure sensor and a pre-set inflating air pressure value, so as to activate or deactivate said air pump.

Preferably, the aforementioned air pump control system further comprises a position signal generating device, which is connected to the central control unit, wherein said position signal generating device is triggered by said switching driving device to generate a position feedback signal, and said central control unit is adapted to send a deactivation signal to said switching driving device to deactivate the switching driving device after said central control unit receives said position feedback signal from said position signal generating device.

Preferably, the aforementioned air pump control system further comprises a first input unit connected to said central control unit and at least provided with at least one of an inflating signal input, a deflating signal input, and a deactivation signal input, said first input unit being adapted to send an inflating signal, a deflating signal or a deactivation signal to said central control unit respectively via said inflating signal input, deflating signal input or deactivation signal input.

Preferably, in the aforementioned air pump control system, said switching driving device further comprises: a motor driving unit connected to said central control unit; and an air passage switching device connected to said air pump, wherein said central control unit is adapted to send an activation signal to said motor driving unit according to the inflating signal, the deflating signal or the deactivation signal respectively sent by said first input unit, so as to activate the switching between said air passages.

Preferably, in the aforementioned air pump control system, said air passages comprise an inflating air passage, a deflating air passage and a closed air passage.

Preferably, in the aforementioned air pump control system, said position signal generating device is adapted to send a position feedback signal to said central control unit when said switching driving device is switched to an inflating air passage, a deflating air passage or a closed air passage, respectively, and said central control unit is adapted to send a deactivation signal to said switching driving device according to the received position feedback signal.

Preferably, in the aforementioned air pump control system, said switching driving device is an electromagnetic valve, and said central control unit is adapted to send a driving signal to said electromagnetic valve according to said inflating signal, deflating signal or deactivation signal so as to switch said electromagnetic valve to the respective inflating air passage, deflating air passage or closed air passage.

Preferably, in the aforementioned air pump control system, said first input unit is further provided with a first inflating signal input, a second inflating signal input, and a third inflating signal input respectively corresponding to three different pre-set inflating air pressure values.

Preferably, in the aforementioned air pump control system, said first input unit is further provided with a manual inflating air pressure input for manually setting an inflating air pressure value.

Preferably, in the aforementioned air pump control system, when said central control unit receives an inflating signal sent by one of said first inflating signal input, second inflating signal input, third inflating signal input, and said manual inflating air pressure input and the internal air pressure value of said inflatable body detected by said air pressure sensor is less than the corresponding pre-set inflating air pressure value, said central control unit sends said driving signal to said motor driving unit to drive the air passage switching device to switch to said inflating air passage and sends said activation signal to said air pump to active said air pump; when the internal air pressure value of said inflatable body detected by said air pressure sensor is greater than the corresponding pre-set inflating air pressure value, said central control unit sends said driving signal to said motor driving unit to drive the air passage switching device to switch to said deflating air passage, so as to deflate the air in the inflatable body to reach the corresponding pre-set inflating air pressure value; and when said central control unit receives said deactivation signal from said deactivation signal input, said central control unit sends said deactivation signal to said motor driving unit to drive the air passage switching device to switch to said closed air passage.

Preferably, the aforementioned air pump control system further comprises a first display unit connected to said central control unit and adapted to receive a display signal generated by said central control unit.

Preferably, in the aforementioned air pump control system, said display signal comprises at least one operating state of said air pump control system, said at least one operating state including one or more of an inflating state, a deflating state, a pre-set inflating air pressure value, a pre-set deflating air pressure value, a current air pressure value, a normal operating state, and an abnormal operating state.

Preferably, the aforementioned air pump control system further comprises a first wireless communication module in communication with said central control unit.

Preferably, the aforementioned air pump control system further comprises a mobile terminal provided with a second input unit and a second wireless communication module in communication with said first wireless communication module, said second input unit being adapted to communicate with said central control unit via said second wireless communication module and said first wireless communication module, said second input unit being at least provided with at least one of an inflating signal input, a deflating signal input and a deactivation signal input, and said second input unit being adapted to send an inflating signal, a deflating signal or a deactivation signal to said central control unit respectively via said inflating signal input, deflating signal input or deactivation signal input.

Preferably, in the aforementioned air pump control system, said second input unit is further provided with a first inflating signal input, a second inflating signal input, and a third inflating signal input respectively corresponding to three different pre-set inflating air pressure values.

Preferably, in the aforementioned air pump control system, said second input unit is further provided with a manual inflating air pressure input for manually setting an inflating air pressure value by said mobile terminal and sending the same to said central control unit.

Preferably, in the aforementioned air pump control system, said mobile terminal further comprises a second display unit, which is adapted to communicate with said central control unit via said second wireless communication module and said first wireless communication module and to receive a display signal generated by said central control unit.

Preferably, in the aforementioned air pump control system, said first wireless communication module and said second wireless communication module are WIFI modules, Bluetooth modules, infrared modules, second-generation mobile communication modules, third-generation mobile communication modules or fourth-generation mobile communication modules.

Preferably, the aforementioned air pump control system further comprises a functional apparatus connected to said central control unit and adapted to receive a control signal from said central control unit, wherein said first input unit further comprises a functional apparatus signal input, and said first input unit is adapted to send a signal for controlling said functional apparatus to said central control unit via said functional apparatus signal input.

Preferably, in the aforementioned air pump control system, said second input unit further comprises a functional apparatus signal input.

Preferably, in the aforementioned air pump control system, said functional apparatus comprises: a temperature controller and a heating device adapted to be mounted on said inflatable body, an external audio apparatus, an external illumination apparatus and/or an external interface.

According to a second aspect of the present invention, an air pump control system is provided, comprising:

a first air pump for inflating or deflating an inflatable body;

a second air pump for supplementing air to said inflatable body;

a switching driving device connected to said first air pump and adapted to drive the switching between two or more air passages; and an air pressure sensor, which is used for detecting an internal air pressure value of said inflatable body, and adapted to generate an internal pressure signal associated with said internal air pressure value and send the same to a central control unit, wherein said central control unit is connected to said first and second air pumps, switching driving device and air pressure sensor, and is adapted to send a driving signal to drive said switching driving device to activate the switching between said air passages, and said central control unit is adapted to send an activation signal or a deactivation signal to said first air pump according to the internal air pressure value of said inflatable body detected by said air pressure sensor and a pre-set inflating air pressure value, so as to activate or deactivate the first air pump, wherein after the internal air pressure value of said inflatable body reaches the pre-set inflating air pressure value, said central control unit is adapted to send an activation signal to said second air pump when the internal air pressure value of said inflatable body detected by said air pressure sensor reaches a pre-set supplementing air pressure value, and to send a deactivation signal to said second air pump when the internal air pressure value of said inflatable body detected by said air pressure sensor again reaches said pre-set inflating air pressure value, and wherein said pre-set supplementing air pressure value is less than or equal to said pre-set inflating air pressure value.

Preferably, the aforementioned air pump control system further comprises a position signal generating device, which is connected to the central control unit, wherein said position signal generating device is triggered by said switching driving device to generate a position feedback signal, and said central control unit is adapted to send a deactivation signal to said switching driving device to deactivate the switching driving device after said central control unit receives said position feedback signal from said position signal generating device.

Preferably, the aforementioned air pump control system further comprises a first input unit connected to said central control unit and at least provided with at least one of an inflating signal input, a deflating signal input, and a deactivation signal input, said first input unit being adapted to send an inflating signal, a deflating signal or a deactivation signal to said central control unit respectively via said inflating signal input, deflating signal input or deactivation signal input.

Preferably, in the aforementioned air pump control system, said switching driving device further comprises: a motor driving unit connected to said central control unit; and an air passage switching device connected to said air pump, wherein said central control unit is adapted to send an activation signal to said motor driving unit according to the inflating signal, the deflating signal or the deactivation signal respectively sent by said first input unit, so as to activate the switching between said air passages.

Preferably, in the aforementioned air pump control system, said air passages comprise an inflating air passage, a deflating air passage and a closed air passage.

Preferably, in the aforementioned air pump control system, said position signal generating device is adapted to send a position feedback signal to said central control unit when said switching driving device is switched to an inflating air passage, a deflating air passage or a closed air passage, respectively, and said central control unit is adapted to send a deactivation signal to said switching driving device according to the received position feedback signal.

Preferably, in the aforementioned air pump control system, said switching driving device is an electromagnetic valve, and said central control unit is adapted to send a driving signal to said electromagnetic valve according to said inflating signal, deflating signal or deactivation signal so as to switch said electromagnetic valve to the respective inflating air passage, deflating air passage or closed air passage.

Preferably, in the aforementioned air pump control system, said first input unit is further provided with a first inflating signal input, a second inflating signal input, and a third inflating signal input respectively corresponding to three different pre-set inflating air pressure values.

Preferably, in the aforementioned air pump control system, said first input unit is further provided with a manual inflating air pressure input for manually setting an inflating air pressure value.

Preferably, in the aforementioned air pump control system, when said central control unit receives an inflating signal sent by one of said first inflating signal input, second inflating signal input, third inflating signal input, and said manual inflating air pressure input and the internal air pressure value of said inflatable body detected by said air pressure sensor is less than the corresponding pre-set inflating air pressure value, said central control unit sends said driving signal to said motor driving unit to drive the air passage switching device to switch to said inflating air passage and sends said activation signal to said air pump to active said air pump; when the internal air pressure value of said inflatable body detected by said air pressure sensor is greater than the corresponding pre-set inflating air pressure value, said central control unit sends said driving signal to said motor driving unit to drive the air passage switching device to switch to said deflating air passage, so as to deflate the air in the inflatable body to reach the corresponding pre-set inflating air pressure value; and when said central control unit receives said deactivation signal from said deactivation signal input, said central control unit sends said deactivation signal to said motor driving unit to drive the air passage switching device to switch to said closed air passage.

Preferably, the aforementioned air pump control system further comprises a first display unit connected to said central control unit and adapted to receive a display signal generated by said central control unit, wherein said display signal comprises at least one operating state of said air pump control system, said at least one operating state including one or more of an inflating state, a deflating state, a pre-set inflating air pressure value, a pre-set deflating air pressure value, a current air pressure value, a normal operating state, and an abnormal operating state.

Preferably, the aforementioned air pump control system further comprises a first wireless communication module in communication with said central control unit, and a mobile terminal provided with a second input unit and a second wireless communication module in communication with said first wireless communication module, said second input unit being adapted to communicate with said central control unit via said second wireless communication module and said first wireless communication module, said second input unit being at least provided with at least one of an inflating signal input, a deflating signal input and a deactivation signal input, and said second input unit being adapted to send an inflating signal, a deflating signal or a deactivation signal to said central control unit respectively via said inflating signal input, deflating signal input or deactivation signal input.

Preferably, in the aforementioned air pump control system, said second input unit is further provided with a first inflating signal input, a second inflating signal input, and a third inflating signal input respectively corresponding to three different pre-set inflating air pressure values, and/or a manual inflating air pressure input for manually setting an inflating air pressure value by said mobile terminal and sending the same to said central control unit.

Preferably, in the aforementioned air pump control system, said mobile terminal further comprises a second display unit, which is adapted to communicate with said central control unit via said second wireless communication module and said first wireless communication module and to receive a display signal generated by said central control unit, and said first wireless communication module and said second wireless communication module are WIFI modules, Bluetooth modules, infrared modules, second-generation mobile communication modules, third-generation mobile communication modules or fourth-generation mobile communication modules.

Preferably, the aforementioned air pump control system further comprises a functional apparatus connected to said central control unit and adapted to receive a control signal from said central control unit, wherein said first input unit further comprises a functional apparatus signal input, and said first input unit is adapted to send a signal for controlling said functional apparatus to said central control unit via said functional apparatus signal input.

According to a third aspect of the present invention, an air pump control method is provided, comprising:

sending an inflating input signal, a deflating input signal or a deactivation input signal to a central control unit;

sending a driving signal to a switching driving device by said central control unit according to said inflating input signal, deflating input signal or deactivation input signal, so that said switching driving device drives the switching between two or more air passages; and sending an activation signal or a deactivation signal to said air pump according to an internal air pressure value of said inflatable body detected by an air pressure sensor and a pre-set inflating air pressure value.

Preferably, in the aforementioned air pump control method, at least one position signal generating device is provided on said switching driving device, wherein the step of said switching driving device driving the switching between two or more air passages further comprises: triggering said position signal generating device by said switching driving device to generate a position feedback signal, and said central control unit sending a deactivation signal to said switching driving device to deactivate the switching driving device after said central control unit receives said position feedback signal from said position signal generating device.

Preferably, in the aforementioned air pump control method, said switching driving device further comprises: a motor driving unit connected to said central control unit, and an air passage switching device connected to said air pump.

Preferably, in the aforementioned air pump control method, said air passages comprises an inflating air passage, a deflating air passage and a closed air passage, wherein the step of said switching driving device driving the switching between two or more air passages further comprises: said position signal generating device sending a position signal to said central control unit when said switching driving device is switched to said inflating air passage, deflating air passage or closed air passage, respectively.

Preferably, in the aforementioned air pump control method, the step of sending an inflating input signal, a deflating input signal or a deactivation input signal to a central control unit further comprises: sending the inflating input signal, the deflating input signal or the deactivation input signal to said central control unit via an inflating signal input, a deflating signal input or a deactivation signal input on an input unit.

Preferably, in the aforementioned air pump control method, when said central control unit receives an inflating signal sent by said inflating signal input and the internal air pressure value of said inflatable body detected by said air pressure sensor is less than the pre-set inflating air pressure value, said central control unit sends said switching driving device to drive the air passage switching device to switch to said inflating air passage and sends said activation signal to said air pump to active said air pump; when the internal air pressure value of said inflatable body detected by said air pressure sensor is greater than the pre-set inflating air pressure value, said central control unit sends said driving signal to said switching driving device to drive the air passage switching device to switch to said deflating air passage, so as to deflate the air in the inflatable body to reach the pre-set inflating air pressure value; and when said central control unit receives said deactivation signal from said deactivation signal input, said central control unit sends said deactivation signal to said motor driving unit to drive the air passage switching device to switch to said closed air passage.

According to a fourth aspect of the present invention, an air pump control method is provided, wherein a first air pump and a second air pump are provided, and said air pump control method comprises:

sending an inflating input signal, a deflating signal or a deactivation input signal to a central control unit;

sending a driving signal to a switching driving device by said central control unit according to said inflating input signal, deflating signal or deactivation input signal, so that said switching driving device drives the switching between two or more air passages; and sending an activation signal or a deactivation signal to said first air pump when an internal air pressure value of said inflatable body detected by an air pressure sensor reaches a pre-set inflating air pressure value;

after the internal air pressure value of said inflatable body reaches the pre-set inflating air pressure value, said central control unit sends an activation signal to said second air pump when the internal air pressure value of said inflatable body detected by said air pressure sensor reaches a pre-set supplementing air pressure value, or sends a deactivation signal to said second air pump when the internal air pressure value of said inflatable body detected by said air pressure sensor again reaches said pre-set inflating air pressure value, and wherein said pre-set supplementing air pressure value is less than or equal to said pre-set inflating air pressure value.

Preferably, in the aforementioned air pump control method, said switching driving device further comprises: a motor driving unit connected to said central control unit, and an air passage switching device connected to said air pump, wherein said motor driving unit drives said air passage switching device to switch the air passages between an inflating air passage, a deflating air passage and a closed air passage, and wherein when said air passage switching device is switched to either the deflating air passage or the closed air passage, said second air pump is shut down.

Preferably, in the aforementioned air pump control method, at least one position signal generating device is provided on said switching driving device, wherein the step of said switching driving device driving the switching between two or more air passages further comprises: triggering said position signal generating device by said switching driving device to generate a position feedback signal, and said central control unit sending a deactivation signal to said switching driving device to deactivate the switching driving device after said central control unit receives said position feedback signal from said position signal generating device.

Preferably, in the aforementioned air pump control method, said switching driving device further comprises: a motor driving unit connected to said central control unit, and an air passage switching device connected to said air pump.

Preferably, in the aforementioned air pump control method, the step of sending an inflating input signal to a central control unit further comprises: sending the inflating input signal to said central control unit via an inflating signal input on an input unit.

Preferably, in the aforementioned air pump control method, said air passages comprise an inflating air passage, a deflating air passage and a closed air passage, wherein an activation signal is sent to said switching driving device while sending a deactivation signal to said first air pump, so as to switch said switching driving device to the closed air passage.

On one hand, the air pump control system and method of the present invention can determine the subsequent operation according to the internal air pressure value of the inflatable body, so that the overall operation efficiency of the air pump is improved, and the problems such as over-inflation and ineffective deflate existing in the prior art are avoided. On the other hand, the present invention further allows an air supplementing pump dedicated to air supplementing operations to be provided in addition to the primary air pump. In this way, effectively controlling the primary air pump and the air supplementing pump respectively can further improve the user's experience, which can not only keep the internal air pressure value of the inflatable body relatively stable for a long time but also reduce the power consumption of the overall product.

It should be understood that both the foregoing general description and the following detailed description of the present invention are exemplary and illustrative, and are intended to provide further explanation of the invention as claimed in the claims.

DESCRIPTION OF THE DRAWINGS

The accompanying drawings, which are included to provide a further understanding of the present invention and are incorporated in and constitute a part of the present application, illustrate embodiments of the present invention and together with the description serve to explain the principle of the present invention. In the accompanying drawings.

DETAILED DESCRIPTION OF THE INVENTION

Figure 1:
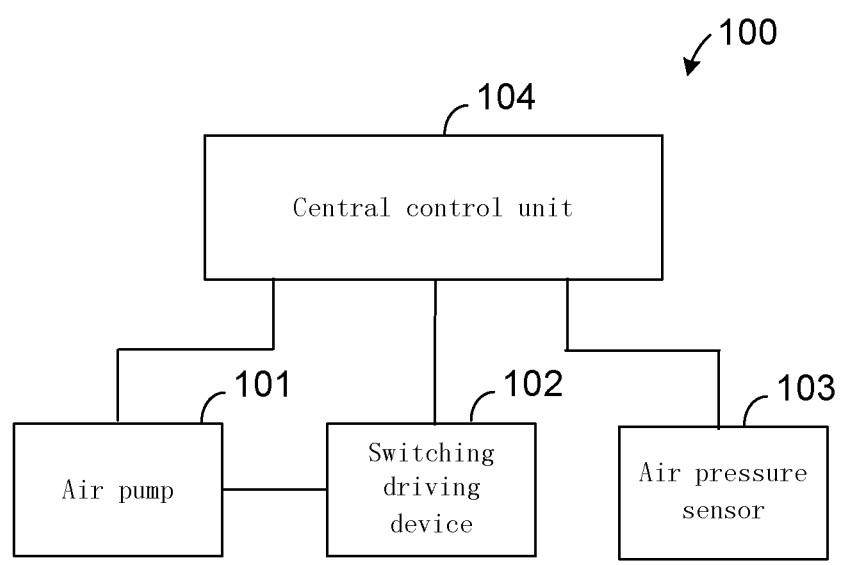
FIG. 1 shows a structural block diagram of an inflation control system according to an embodiment of the present invention.

Embodiments of the present invention will now be described in detail with reference to the accompanying drawings. Reference now will be made in detail to preferred embodiments of the present invention, examples of which are illustrated in the accompanying drawings. The same reference numerals in all the figures denote identical or similar parts wherever possible. Furthermore, although the terms used in the present invention are selected from well-known common terms, some of the terms mentioned in the description of the present invention may be selected by the applicant according to his or her judgement, and the detailed meaning thereof is described in the relevant section described herein. Furthermore, the present invention must be understood, not simply by the actual terms used but also by the meanings encompassed by each term.

Firstly, reference is made to FIG. 1, which shows a structural block diagram of an inflation control system according to an embodiment of the present invention. The air pump control system 100 in the embodiment shown in FIG. 1 mainly comprises: an air pump 101, a switching driving device 102, an air pressure sensor 103 and a central control unit 104.

The air pump 101 is configured to inflate or deflate an inflatable body (not shown).

The switching driving device 102 is connected to the air pump 101 and drives the switching between two or more air passages.

Figure 2:
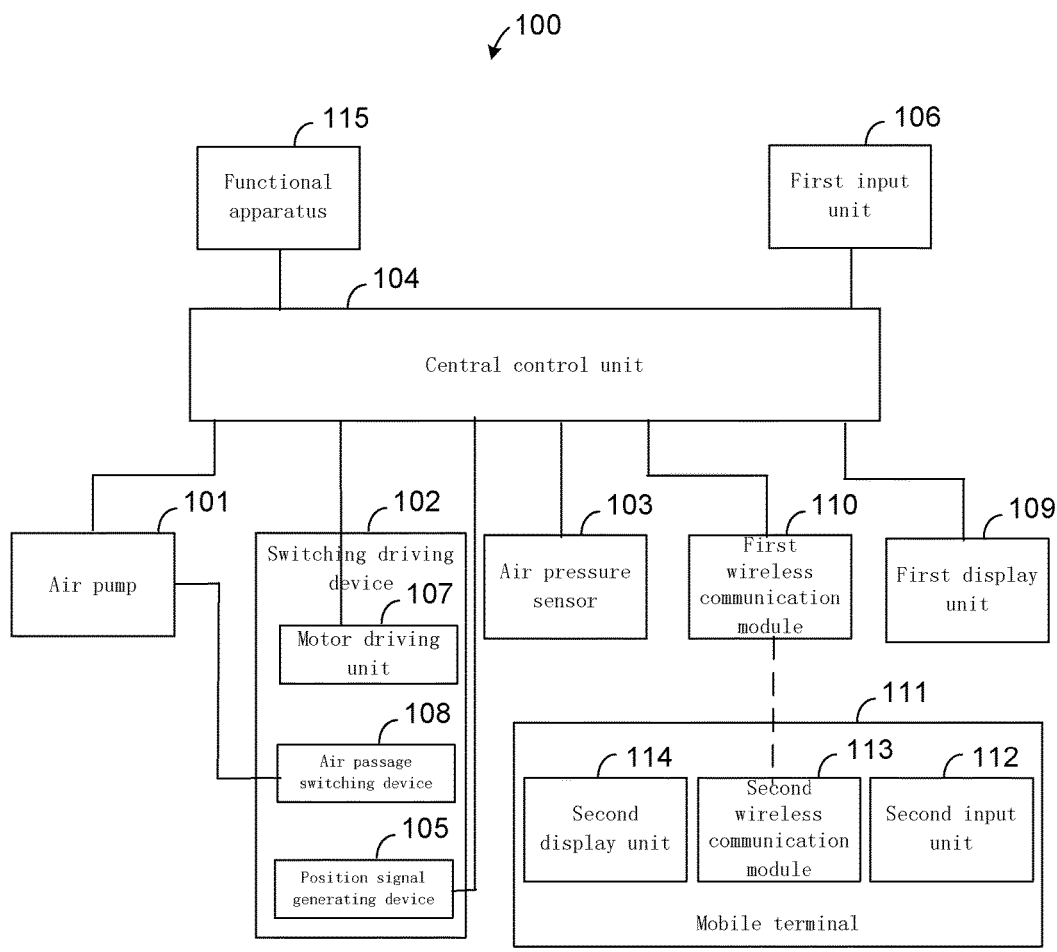
FIG. 2 shows a preferred embodiment of an inflation system.

According to an embodiment, as shown in FIG. 2, the switching driving device 102 may further comprise a motor driving unit 107 and an air passage switching device 108. The motor driving unit 107 is connected to the central control unit 104, and the air passage switching device 108 is connected to the air pump 101. Furthermore, said air passages may comprise an inflating air passage, a deflating air passage and a closed air passage, and said air passage switching is the switching between the inflating air passage, the deflating air passage and the closed air passage. Thus, the central control unit 104 may send an activation signal to the motor driving unit 107 according to the inflating signal, the deflating signal or the deactivation signal respectively sent by the first input unit, which will be further discussed below, so as to activate the switching between the air passages.

According to another embodiment, the switching driving device 102 may be an electromagnetic valve. The central control unit 104 may send a driving signal to the electromagnetic valve according to the inflating signal, deflating signal or deactivation signal so as to switch the electromagnetic valve to the respective inflating air passage, deflating air passage or closed air passage. For example, the electromagnetic valve may take the place of the motor driving unit 107 to control the air passage switching device 108 to perform the air passage switching, or the electromagnetic valve may also directly take the place of both the motor driving unit 107 and the air passage switching device 108 and implement air passage switching operations independently.

The air pressure sensor 103 detects an internal air pressure value of the inflatable body, and sends an internal pressure signal associated with the internal air pressure value to the central control unit 104.

As shown in this figure, the central control unit 104 establishes a connection with the air pump 101, the switching driving device 102 and the air pressure sensor 103, respectively. In this way, the central control unit 104 may send a driving signal to drive the switching driving device 102 to activate the switching between the air passages, and send an activation signal or a deactivation signal to the air pump 101 according to the internal air pressure value of the inflatable body detected by the air pressure sensor 103 and a pre-set inflating air pressure value, so as to activate or deactivate the air pump 101.

For example, when the inflatable body is inflated, the air pump 101 inflates the inflatable body to a pre-set inflating air pressure value (standard inflating air pressure) and then is automatically shut down, and when air is to be deflated from the inflatable body, the air pump 101 deflates the air from the inflatable body to a nominal air pressure value (air pressure value when emptying the inflatable body) and then is automatically shut down. Furthermore, when the air pump 101 deactivates the inflation or discharging, the air passage switching device may be driven to a closed position for deactivation.

Now turning to FIG. 2, this figure shows a more specific preferred embodiment of the present invention.

Firstly, in the preferred embodiment shown in FIG. 2, the air pump control system 100 may further comprise a position signal generating device 105. The position signal generating device 105 is preferably connected to the central control unit. Alternatively, the position signal generating device 105 may be arranged independently from the switching driving device 102.

The position signal generating device 105 may be triggered by the switching driving device 102 to generate a position feedback signal, and the central control unit 104 sends a deactivation signal to the switching driving device 102 to deactivate the switching driving device 102 after the central control unit receives the position feedback signal from the position signal generating device 105.

For example, the position signal generating device 105 may send a position feedback signal to the central control unit 104 respectively when the switching driving device 102 is switched to the inflating air passage, the deflating air passage or the closed air passage, which indicates that one air passage switching is completed. Subsequently, the central control unit 104 sends a deactivation signal to the switching driving device 102 according to the received position feedback signal.

As another approach, the present invention may also use a program instead of the position signal generating device 105 to control the operating time of a drive motor (not shown) in the switching driving device 102 to switch the drive motor to the corresponding air passage. For example, said three air passages, namely the inflating air passage, the deflating air passage and the closed air passage, may have the identical travel therebetween, so that the switching between the three air passages can be achieved successively by driving for a fixed working time with the drive motor.

Furthermore, the air pump control system 100 in this embodiment may further comprise a first input unit 106 connected to the central control unit 104. The first input unit 106 is at least provided with at least one of an inflating signal input, a deflating signal input, and a deactivation signal input. The first input unit 106 sends an inflating signal, a deflating signal or a deactivation signal to the central control unit 104 respectively via the inflating signal input, deflating signal input or deactivation signal input.

Preferably, the first input unit 106 may be further provided with a first inflating signal input, a second inflating signal input, and a third inflating signal input respectively corresponding to three different pre-set inflating air pressure values. Alternatively, the first input unit 106 may be further provided with a manual inflating air pressure input for manually setting an inflating air pressure value.

On the basis of the above structure, when the central control unit 104 receives an inflating signal sent by one of the first inflating signal input, second inflating signal input, third inflating signal input, and the manual inflating air pressure input and the internal air pressure value of the inflatable body detected by the air pressure sensor 103 is less than the corresponding pre-set inflating air pressure value, the central control unit sends the driving signal to the motor driving unit 107 to drive the air passage switching device 108 to switch to the inflating air passage and sends the activation signal to the air pump 101 to active the air pump 101; when the internal air pressure value of the inflatable body detected by the air pressure sensor 103 is greater than the corresponding pre-set inflating air pressure value, the central control unit 104 sends the driving signal to the motor driving unit 107 to drive the air passage switching device 108 to switch to the deflating air passage, so as to deflate the air in the inflatable body to reach the corresponding pre-set inflating air pressure value; and when the central control unit 104 receives the deactivation signal from the deactivation signal input, the central control unit sends the deactivation signal to the motor driving unit 107 to drive the air passage switching device 108 to switch to the closed air passage.

Furthermore, in the embodiment as shown in FIG. 2, the air pump control system 100 may further comprise a first display unit 109 connected to the central control unit 104. The first display unit 109 may receive a display signal generated by the central control unit 104. For example, the display signal comprises at least one operating state of the air pump control system, the at least one operating state including one or more of an inflating state, a deflating state, a pre-set inflating air pressure value, a pre-set deflating air pressure value, a current air pressure value, a normal operating state, and an abnormal operating state.

Furthermore, the air pump control system 100 may further comprise a first wireless communication module 110 in communication with the central control unit 104. Accordingly, the system 100 may also comprise a mobile terminal 111. For example, the mobile terminal 111 may be any known mobile communication terminal such as a cell phone, PDA, and tablet. The mobile terminal 111 is provided with a second input unit 112, a second wireless communication module 113 in communication with the first wireless communication module 110, and a second display unit 114.

The second input unit 112 is in communication with the central control unit 104 via the second wireless communication module 113 and the first wireless communication module 110. The second input unit 112 is at least provided with at least one of an inflating signal input, a deflating signal input, and a deactivation signal input. The second input unit 112 sends an inflating signal, a deflating signal or a deactivation signal to the central control unit 104 respectively via the inflating signal input, deflating signal input or deactivation signal input. Similarly to the first input unit 106, the second input unit 112 may be also provided with a first inflating signal input, a second inflating signal input, and a third inflating signal input respectively corresponding to three different pre-set inflating air pressure values. Moreover, the second input unit 112 is further provided with a manual inflating air pressure input for manually setting an inflating air pressure value by the mobile terminal 111 and sending the same to the central control unit 104.

The second display unit 114 is in communication with the central control unit 104 via the second wireless communication module 113 and the first wireless communication module 110 and receives a display signal generated by the central control unit 104.

By way of example but not limitation, the first wireless communication module 110 and the second wireless communication module 113 discussed above are WIFI modules, Bluetooth modules, infrared modules, second-generation mobile communication modules, third-generation mobile communication modules or fourth-generation mobile communication modules.

According to the above-mentioned structure, the user may use the second input unit 112 of the mobile terminal 111 to remotely control the air pump control system 100, and may also use the second display unit 114 of the mobile terminal 111 to remotely monitor various working conditions of the air pump control system 100 at the same time.

More preferably, the air pump control system 100 may further comprise a functional apparatus 115. The functional apparatus 115 is connected to the central control unit 104 and receives a control signal from the central control unit 104. Accordingly, the first input unit 106 further comprises a signal input of the functional apparatus 115. The first input unit 106 sends the control signal for the functional apparatus 106 to the central control unit 104 via the signal input of the functional apparatus 115. Alternatively, the second input unit 112 on the mobile terminal 111 may further comprise a signal input of the functional apparatus.

By way of example, the functional apparatus 115 may comprise a temperature controller and a heating device adapted to be mounted on the inflatable body, and external functional apparatuses such as an external audio apparatus, an external illumination apparatus and/or an external interface.

The air pump control system 100 discussed above can determine the subsequent operation according to the internal air pressure value of the inflatable body, so that the overall operation efficiency of the air pump is improved, and the problems such as over-inflation and ineffective deflate existing in the prior art are avoided.

Figure 3:
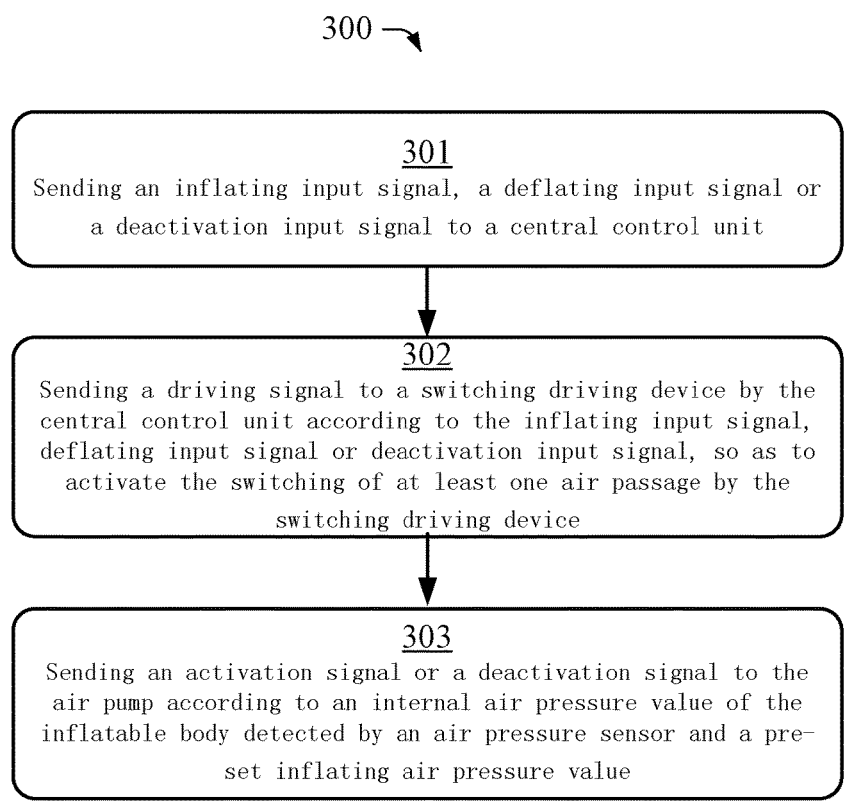
FIG. 3 shows a flowchart for the essential steps of an inflation control method applicable to the inflation control system shown in FIG. 1.

Now turning to FIG. 3, this figure shows essential steps of an air pump control method applicable to the air pump control system shown in FIG. 1.

As shown in FIG. 3, the air pump control method 300 mainly comprises the following steps:

Step 301: sending an inflating input signal, a deflating input signal or a deactivation input signal to a central control unit;

Step 302: sending a driving signal to a switching driving device by the central control unit according to the inflating input signal, deflating input signal or deactivation input signal, so that the switching driving device drives the switching between two or more air passages; and Step 303: sending an activation signal or a deactivation signal to the air pump according to an internal air pressure value of the inflatable body detected by an air pressure sensor and a pre-set inflating air pressure value.

According to a preferred embodiment, the inflating input signal, the deflating input signal or the deactivation input signal may be sent to the central control unit via the inflating signal input, the deflating signal input or the deactivation signal input of the first input unit or second input unit as shown in FIG. 2, for example. A driving signal is then sent by the central control unit to a switching driving device according to the inflating input signal, deflating input signal or deactivation input signal, so that the switching driving device drives the switching between two or more air passages. In the case where at least one position signal generating device is provided on the switching driving device, for example, in the embodiment as shown in FIG. 2, the step of the switching driving device driving the switching between two or more air passages in step 302 may further comprise: triggering the position signal generating device by the switching driving device to generate a position feedback signal, and the central control unit sending a deactivation signal to the switching driving device to deactivate the switching driving device after the central control unit receives the position feedback signal from the position signal generating device.

As discussed above, the air passages comprise an inflating air passage, a deflating air passage and a closed air passage. In this way, the step of the switching driving device driving the switching between two or more air passages may comprise: the position signal generating device sending a position signal to the central control unit when the switching driving device is switched to the inflating air passage, deflating air passage or closed air passage, respectively.

More particularly, in Step 303, when the central control unit receives an inflating signal sent by the inflating signal input and the internal air pressure value of the inflatable body detected by the air pressure sensor is less than the pre-set inflating air pressure value, the central control unit sends the switching driving device to drive the air passage switching device to switch to the inflating air passage and sends the activation signal to the air pump to active the air pump; when the internal air pressure value of the inflatable body detected by the air pressure sensor is greater than the pre-set inflating air pressure value, the central control unit sends the driving signal to the switching driving device to drive the air passage switching device to switch to the deflating air passage, so as to deflate the air in the inflatable body to reach the pre-set inflating air pressure value; and when the central control unit receives the deactivation signal from the deactivation signal input, the central control unit sends the deactivation signal to the motor driving unit to drive the air passage switching device to switch to the closed air passage.

Based on the above control method, the subsequent operation can be determined according to the internal air pressure value of the inflatable body, so that the overall operation efficiency of the air pump is improved, and the problems such as over-inflation and ineffective deflate existing in the prior art are avoided.

Figure 4:
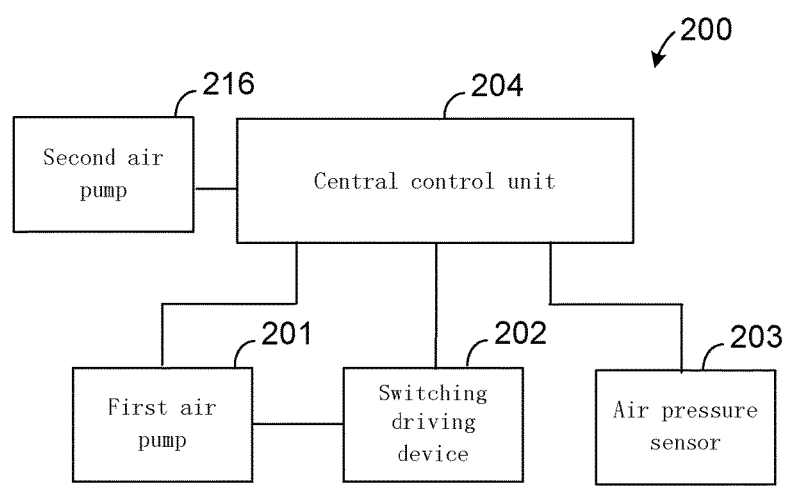
FIG. 4 shows a structural block diagram of an inflation control system according to another embodiment of the present invention.

Now turning to FIG. 4, this figure shows a structural block diagram of an inflation control system according to another embodiment of the present invention. The air pump control system 200 in the embodiment shown in FIG. 4 mainly comprises: an air pump (main air pump) 201, a second air pump (air supplementing pump) 216, a switching driving device 202, an air pressure sensor 203 and a central control unit 204.

The first air pump 201 is configured to inflate or deflate an inflatable body (not shown). The second air pump 216 is configured to supplement the inflatable body with air. Generally, the first air pump 201, as the primary air pump, takes the form of a quick inflation air pump with a relatively large power, and the second air pump 216, as the air supplementing pump, generally only needs to take the form of an air pump with a relatively small output power and less noise, such that the air supplementing process is slow but steady. This can not only make the user feel that the inflatable body is kept in a relatively stable air pressure situation for a long time, but also hides the noise generated by the air supplementing pump during air supplementing from the user.

The switching driving device 202 is connected to the first air pump 201 and drives the switching between two or more air passages.

According to an embodiment, as shown in FIG. 2, the switching driving device 202 may further comprise a motor driving unit 207 and an air passage switching device 208. The motor driving unit 207 is connected to the central control unit 204, and the air passage switching device 208 is connected to the first air pump 201. Furthermore, said air passages may comprise an inflating air passage, a deflating air passage and a closed air passage, and said air passage switching is the switching between the inflating air passage, the deflating air passage and the closed air passage. Thus, the central control unit 204 may send an activation signal to the motor driving unit 207 according to the inflating signal, the deflating signal or the deactivation signal respectively sent by the first input unit, which will be further discussed below, so as to activate the switching between the air passages.

According to another embodiment, the switching driving device 202 may be an electromagnetic valve. The central control unit 204 may send a driving signal to the electromagnetic valve according to the inflating signal, deflating signal or deactivation signal so as to switch the electromagnetic valve to the respective inflating air passage, deflating air passage or closed air passage. For example, the electromagnetic valve may take the place of the motor driving unit 207 to control the air passage switching device 208 to perform the air passage switching, or the electromagnetic valve may also directly take the place of both the motor driving unit 207 and the air passage switching device 208 and implement air passage switching operations independently.

The air pressure sensor 203 detects an internal air pressure value of the inflatable body, and sends an internal pressure signal associated with the internal air pressure value to the central control unit 204.

As shown in FIG. 4, the central control unit 204 establishes a connection with the first air pump 201, the second air pump 216, the switching driving device 202 and the air pressure sensor 203, respectively. In this way, the central control unit 204 may send a driving signal to drive the switching driving device 202 to activate the switching between the air passages, and send an activation signal or a deactivation signal to the first air pump 201 according to the internal air pressure value of the inflatable body detected by the air pressure sensor 203 and a pre-set inflating air pressure value, so as to activate or deactivate the first air pump 201.

Moreover, after the internal air pressure value of the inflatable body reaches the pre-set inflating air pressure value, the central control unit 204 sends an activation signal to the second air pump 216 when the internal air pressure value of the inflatable body detected by the air pressure sensor 203 reaches a pre-set supplementing air pressure value, and sends a deactivation signal to the second air pump 216 when the internal air pressure value of the inflatable body detected by the air pressure sensor 203 again reaches the pre-set inflating air pressure value. The pre-set supplementing air pressure value is less than or equal to the pre-set inflating air pressure value.

Figure 5:
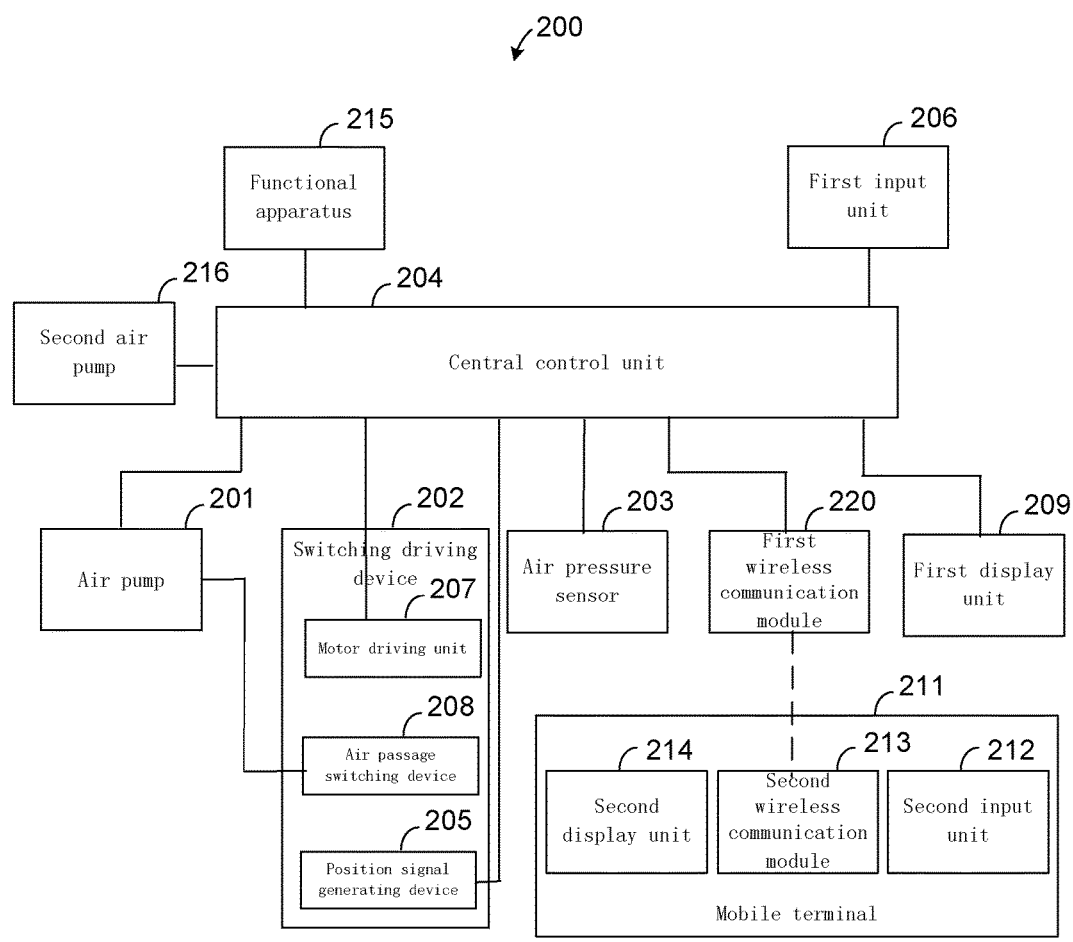
FIG. 5 shows another preferred embodiment of the inflation system.

Now turning to FIG. 5, FIG. 5 shows another more specific preferred embodiment of the present invention.

Firstly, in the preferred embodiment shown in FIG. 5, the air pump control system 200 may further comprise a position signal generating device 205. The position signal generating device 205 is preferably provided on the switching driving device 202. Alternatively, the position signal generating device 205 may be arranged separately from the switching driving device 202.

The position signal generating device 205 may be triggered by the switching driving device 202 to generate a position feedback signal, and the central control unit 204 sends a deactivation signal to the switching driving device 202 to deactivate the switching driving device 202 after the central control unit receives the position feedback signal from the position signal generating device 205.

For example, the position signal generating device 205 may send a position feedback signal to the central control unit 204 respectively when the switching driving device 202 is switched to the inflating air passage, the deflating air passage or the closed air passage, which indicates that one air passage switching is completed. Subsequently, the central control unit 204 sends a deactivation signal to the switching driving device 202 according to the received position feedback signal.

On the other hand, the air pump control system 200 in this embodiment may further comprise a first input unit 206 connected to the central control unit 204. The first input unit 206 is at least provided with at least one of an inflating signal input, a deflating signal input, and a deactivation signal input. The first input unit 206 sends an inflating signal, a deflating signal or a deactivation signal to the central control unit 204 respectively via the inflating signal input, deflating signal input or deactivation signal input.

Preferably, the first input unit 206 may be further provided with a first inflating signal input, a second inflating signal input, and a third inflating signal input respectively corresponding to three different pre-set inflating air pressure values. Alternatively, the first input unit 206 may be further provided with a manual inflating air pressure input for manually setting an inflating air pressure value.

On the basis of the above structure, when the central control unit 204 receives an inflating signal sent by one of the first inflating signal input, second inflating signal input, third inflating signal input, and the manual inflating air pressure input and the internal air pressure value of the inflatable body detected by the air pressure sensor 203 is less than the corresponding pre-set inflating air pressure value, the central control unit sends the driving signal to the motor driving unit 207 to drive the air passage switching device 208 to switch to the inflating air passage and sends the activation signal to the first air pump 201 to active the first air pump 201; when the internal air pressure value of the inflatable body detected by the air pressure sensor 203 is greater than the corresponding pre-set inflating air pressure value, the central control unit 204 sends the driving signal to the motor driving unit 207 to drive the air passage switching device 208 to switch to the deflating air passage, so as to deflate the air in the inflatable body to reach the corresponding pre-set inflating air pressure value; and when the central control unit 204 receives the deactivation signal from the deactivation signal input, the central control unit sends the deactivation signal to the motor driving unit 207 to drive the air passage switching device 208 to switch to the closed air passage.

Furthermore, in the embodiment as shown in FIG. 5, the air pump control system 200 may further comprise a first display unit 209 connected to the central control unit 204. The first display unit 209 may receive a display signal generated by the central control unit 204. For example, the display signal comprises at least one operating state of the air pump control system, the at least one operating state including one or more of an inflating state, a deflating state, a pre-set inflating air pressure value, a pre-set deflating air pressure value, a current air pressure value, a normal operating state, and an abnormal operating state.

Furthermore, the air pump control system 200 may further comprise a first wireless communication module 120 in communication with the central control unit 204. Accordingly, the system 200 may also comprise a mobile terminal 211. The mobile terminal 211 is provided with a second input unit 212, a second wireless communication module 213 in communication with the first wireless communication module 120, and a second display unit 214.

The second input unit 212 is in communication with the central control unit 204 via the second wireless communication module 213 and the first wireless communication module 120. The second input unit 212 is at least provided with at least one of an inflating signal input, a deflating signal input, and a deactivation signal input. The second input unit 212 sends an inflating signal, a deflating signal or a deactivation signal to the central control unit 204 respectively via the inflating signal input, deflating signal input or deactivation signal input. Similarly to the first input unit 206, the second input unit 212 may be also provided with a first inflating signal input, a second inflating signal input, and a third inflating signal input respectively corresponding to three different pre-set inflating air pressure values. Moreover, the second input unit 212 is further provided with a manual inflating air pressure input for manually setting an inflating air pressure value by the mobile terminal 211 and sending the same to the central control unit 204.

The second display unit 214 is in communication with the central control unit 204 via the second wireless communication module 213 and the first wireless communication module 120 and receives a display signal generated by the central control unit 204.

By way of example but not limitation, the first wireless communication module 120 and the second wireless communication module 213 discussed above are WIFI modules, Bluetooth modules, infrared modules, second-generation mobile communication modules, third-generation mobile communication modules or fourth-generation mobile communication modules.

More preferably, the air pump control system 200 may further comprise a functional apparatus 215. The functional apparatus 215 is connected to the central control unit 204 and receives a control signal from the central control unit 204. Accordingly, the first input unit 206 further comprises a signal input of the functional apparatus 215. The first input unit 206 sends the control signal for the functional apparatus 206 to the central control unit 204 via the signal input of the functional apparatus 215. Alternatively, the second input unit 212 on the mobile terminal 211 may further comprise a signal input of the functional apparatus.

By way of example, the functional apparatus 215 may comprise a temperature controller and a heating device adapted to be mounted on the inflatable body, and external functional apparatuses such as an external audio apparatus, an external illumination apparatus and/or an external interface.

The air pump control system 200 discussed above can not only determine the subsequent operation according to the internal air pressure value of the inflatable body, but also effectively control the primary air pump and the air supplementing pump respectively to further improve the user's experience, which can not only keep the internal air pressure value of the inflatable body relatively stable for a long time but also reduce the power consumption of the overall product.

Figure 6:
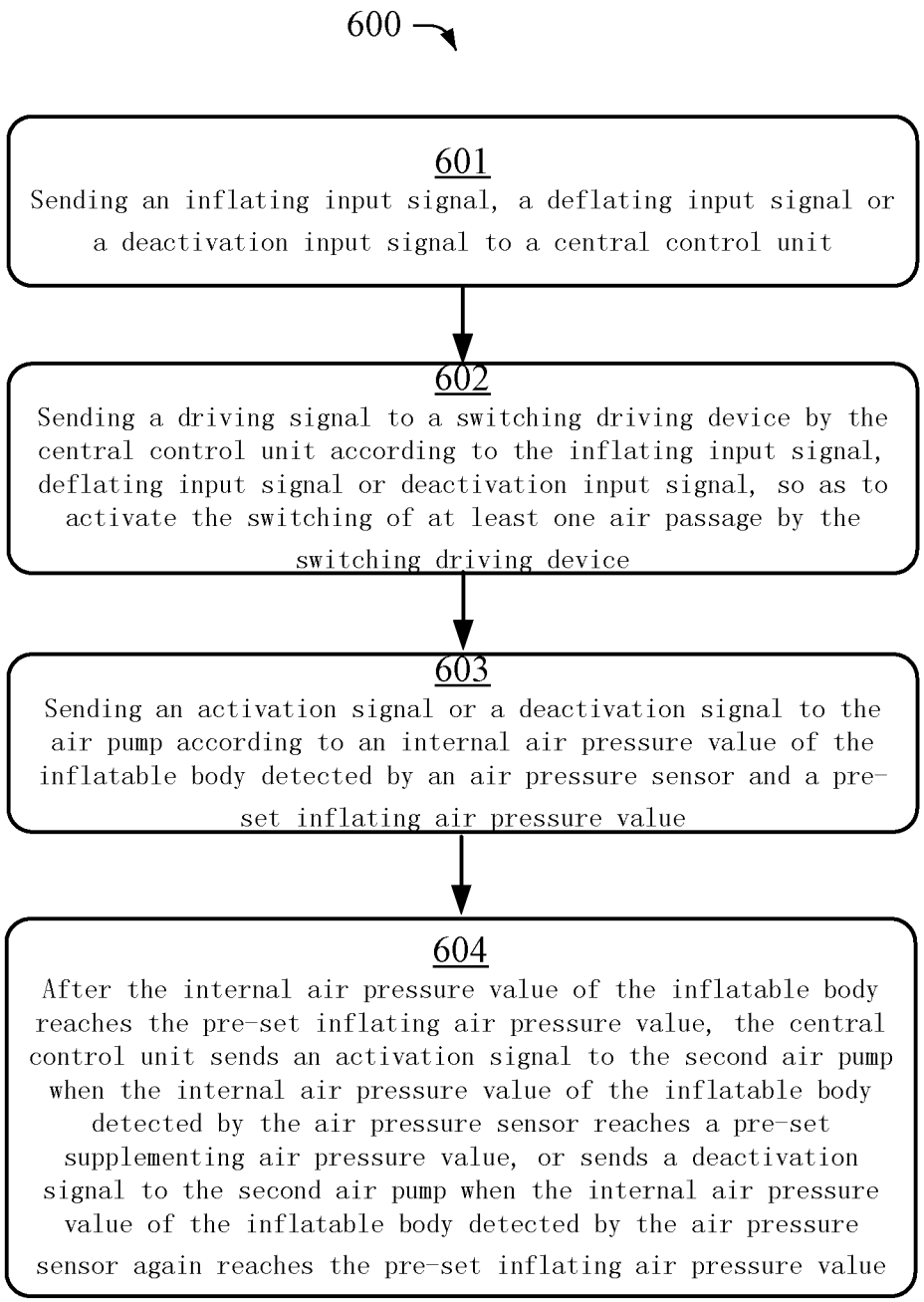
FIG. 6 shows a flowchart for the essential steps of an inflation control method applicable to the inflation control system shown in FIG. 4.

Now turning to FIG. 6, this figure shows essential steps of an air pump control method applicable to the air pump control system shown in FIG. 4.

As shown in FIG. 6, the air pump control method 600 mainly comprises the following steps:

Step 601: sending an inflating input signal, a deflating input signal or a deactivation input signal to a central control unit;

Step 602: sending a driving signal to a switching driving device by the central control unit according to the inflating input signal, deflating input signal or deactivation input signal, so that the switching driving device drives the switching between two or more air passages;

Step 603: sending an activation signal or a deactivation signal to the air pump according to an internal air pressure value of the inflatable body detected by an air pressure sensor and a pre-set inflating air pressure value; and Step 604: after the internal air pressure value of the inflatable body reaches the pre-set inflating air pressure value, the central control unit sends an activation signal to the second air pump when the internal air pressure value of the inflatable body detected by the air pressure sensor reaches a pre-set supplementing air pressure value, or sends a deactivation signal to the second air pump when the internal air pressure value of the inflatable body detected by the air pressure sensor again reaches the pre-set inflating air pressure value, and wherein the pre-set supplementing air pressure value is less than or equal to the pre-set inflating air pressure value.

An application example of the above air pump control method 600 is discussed below in conjunction with the structure shown in FIG. 5, the inflating input signal, the deflating input signal or the deactivation input signal may be sent to the central control unit via the inflating signal input, the deflating signal input or the deactivation signal input of the first input unit 206 or the second input unit 211 as shown in FIG. 5, for example. A driving signal is then sent by the central control unit 204 to a switching driving device 202 according to the inflating input signal, deflating input signal or deactivation input signal, so that the switching driving device 202 drives the switching between two or more air passages.

The switching driving device 202 further comprises a motor driving unit 207 connected to the central control unit 204, and an air passage switching device 208 connected to the first air pump 201.

The motor driving unit 207 drives the air passage switching device 208 to switch the air passages between an inflating air passage, a deflating air passage and a closed air passage. Furthermore, for example, when the inflation starts up (such as when the user presses an inflation button), said second air pump 216 will firstly be switched to a standby state, and then periodically performs the air supplementing operation in the manner discussed in the above step 604. When shutting down or deflating (such as when the user presses a shut-down button or a deflation button), the second air pump 216 will be shut down.

According to a preferred embodiment, in the case where at least one position signal generating device is provided on the switching driving device, for example, in the embodiment as shown in FIG. 5, the step of the switching driving device driving the switching between two or more air passages in step 602 may further comprise: triggering the position signal generating device by the switching driving device to generate a position feedback signal, and the central control unit sending a deactivation signal to the switching driving device to deactivate the switching driving device after the central control unit receives the position feedback signal from the position signal generating device.

As discussed above, the air passages comprise an inflating air passage, a deflating air passage and a closed air passage. In this way, the step of the switching driving device driving the switching between two or more air passages may comprise: the position signal generating device sending a position signal to the central control unit when the switching driving device is switched to the inflating air passage, deflating air passage or closed air passage, respectively.

More particularly, in step 603, when the central control unit receives an inflating signal sent by the inflating signal input and the internal air pressure value of the inflatable body detected by the air pressure sensor is less than the pre-set inflating air pressure value, the central control unit sends the switching driving device to drive the air passage switching device to switch to the inflating air passage and sends the activation signal to the air pump to active the air pump; when the internal air pressure value of the inflatable body detected by the air pressure sensor is greater than the pre-set inflating air pressure value, the central control unit sends the driving signal to the switching driving device to drive the air passage switching device to switch to the deflating air passage, so as to deflate the air in the inflatable body to reach the pre-set inflating air pressure value; and when the central control unit receives the deactivation signal from the deactivation signal input, the central control unit sends the deactivation signal to the motor driving unit to drive the air passage switching device to switch to the closed air passage.

Figure 7:
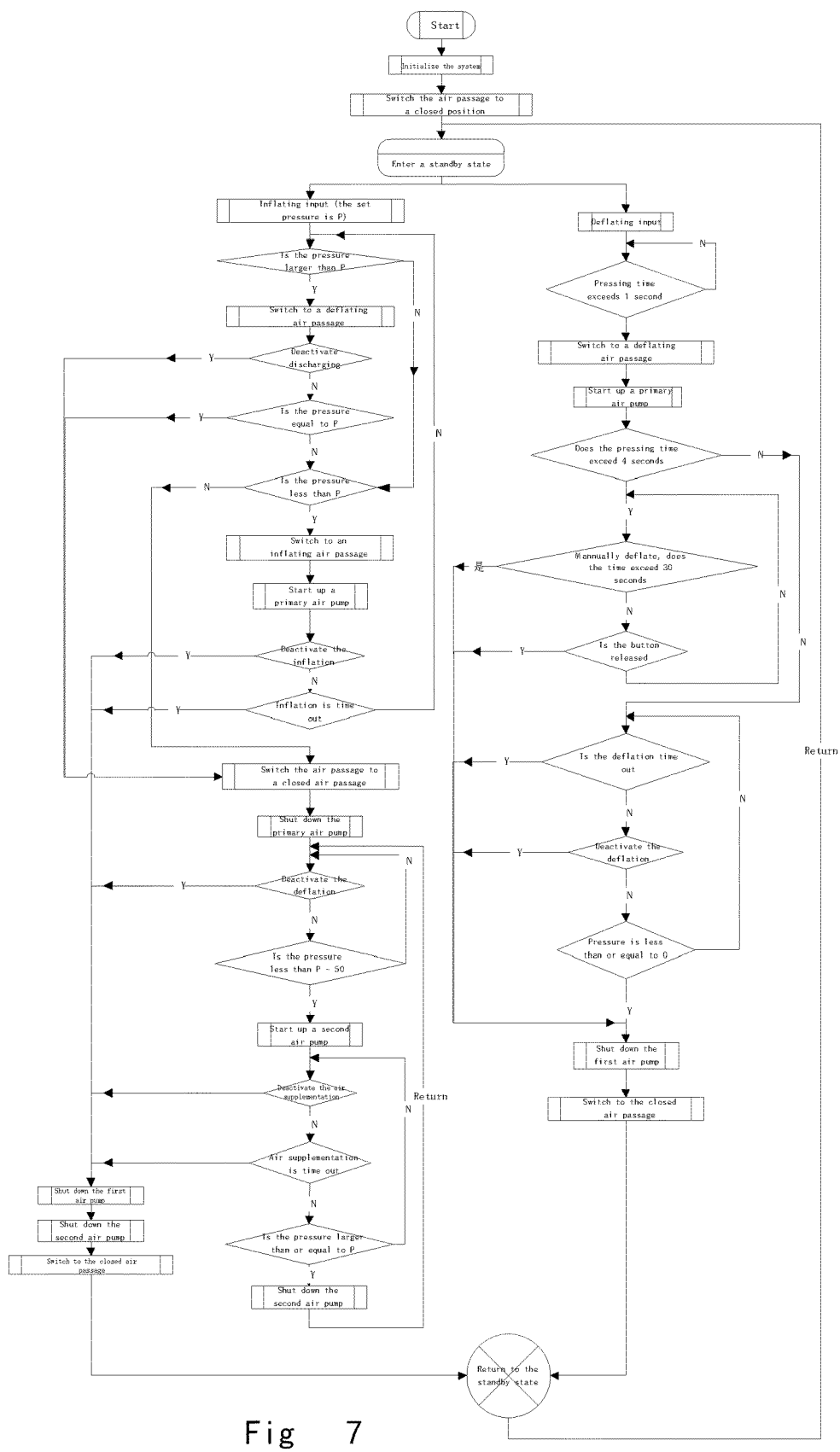
FIG. 7 shows a flowchart of a specific operation embodiment based on the essential steps shown in FIG. 6.

For example, based on the steps shown in FIG. 6, FIG. 7 shows a more specific operational flow. This flow is applicable to the inflation control system shown in FIG. 4 or 5.

After the air pump control system is initialized, the flow is firstly switched to the closed air passage, so that the entire air pump control system enters the standby state.

Next, in the case where the user presses the inflation input on the input unit (such as the aforementioned first input unit or second input unit), if an initially set inflating air pressure is assumed to be P, then the air pressure sensor would detect whether the current pressure of the inflatable body is greater than P. If the pressure is greater than P, it is switched to the inflating air passage, so as to deflate the air until the pressure reaches P. In this process, if an input of deactivating the deflate is received, it is directly switched to the closed air passage. Furthermore, if the pressure is less than P, it is switch to the inflating air passage, and then the first air pump (primary air pump) is turned on; else if the pressure is neither greater than nor less than P, there is no need to inflate and the air passage is switched to the closed air passage. Whether the user presses the input of deactivating the inflation and whether the inflation is time out are monitored during inflation, and when the above situations are monitored, the system can shut down the first air pump and the second air pump successively and switch to the closed air passage to enter the standby state. Furthermore, after the first air pump is inflated to the pressure P such that the air passage is switched to the closed air passage, the first air pump (primary air pump) is shut down, then the air pressure sensor would further detect whether the current pressure within the inflatable body is lower than a pre-set supplementing air pressure (for example, P-50). If yes, then the second air pump (air supplementing pump) starts up to supplement air until the pressure inside the supplemented inflatable body is greater than or equal to P again, and the second air pump (air supplementing pump) is shut down. In the process of air supplement, whether the user deactivates the air supplementation and whether the air supplementation is time out need to be monitored simultaneously, and when the above situations are found, the system can return to the aforementioned standby state.

Alternatively, in the case where the user presses the deflating input on the input unit (such as the aforementioned first input unit or second input unit), firstly, it is possible to determine whether the period of time during which the deflating input is pressed exceeds a pre-set time of one second, and only when it exceeds one second, the air passage is driven to switch to the deflating air passage and then the first air pump (primary air pump) starts up for deflation. Secondly, if it is determined that the period of time during which the deflating input is pressed exceeds a pre-set time of four seconds, a manual deflating mode is enabled, meanwhile, it is further determined whether the deflation button is released, and when it is detected that the deflation button is released, the deflation is deactivated, i.e., the primary air pump is shut down and the air passage is switched to the closed air passage. Furthermore, during deflation, the air pressure sensor needs to monitor whether the air pressure inside the inflatable body is less than or equal to 0 in real time; if it is determined that the air pressure inside the inflatable body is less than or equal to 0, the deflation is directly deactivated, i.e., the primary air pump is shut down and the air passage is switched to the closed air passage, and then the whole system re-enter the standby state.

In summary, the air pump control system and method of the present invention effectively improve the overall layout and control method of the air pump in the prior art, and substantially increase the operational efficiency and user's experience.

On one hand, the present invention can determine the subsequent operation according to the internal air pressure value of the inflatable body, so that the overall operation efficiency of the air pump is improved, and the problems such as over-inflation and ineffective deflate commonly existing in the prior art are avoided.

On the other hand, the present invention further allows an air supplementing pump dedicated to air supplementing operations to be provided in addition to the primary air pump. In this way, effectively controlling the primary air pump and the air supplementing pump respectively can further improve the user's experience, which can not only keep the internal air pressure value of the inflatable body relatively stable for a long time but also reduce the power consumption of the overall product.

The aforementioned techniques of the present invention can also be applicable to other types of air pumps, for example, some of the air pumps achieve the inflation and deflation respectively by the forward and reverse rotation of a motor inside the air pump. In such air pumps, although there is no need to switch the air passages when switching between inflation and deflation, the aforementioned control techniques of the present invention can also be used.

It will be apparent to a person skilled in the art that various modifications and variations can be made to the aforementioned exemplary embodiments of the present invention without departing from the scope or spirit of the present invention. The present invention is therefore intended to cover any modifications and variations of the present invention falling within the scope of the appended claims and equivalent technical solutions thereof.

What is claimed is:

1. An air pump control system comprising:
    an air pump for inflating or deflating an inflatable body;
    a switching driving device connected to said air pump and adapted to drive a switching between two or more air passages; and
    an air pressure sensor for detecting an internal air pressure value of said inflatable body and adapted to generate an internal pressure signal associated with said internal air pressure value and send said internal pressure signal to a central control unit;

a position signal generating device connected to said central control unit and a first input unit connected to said central control unit and at least provided with at least one of an inflating signal input, a deflating signal input, and a deactivation signal input, said first input unit being adapted to send an inflating signal, a deflating signal or a deactivation signal to said central control unit respectively via said inflating signal input, deflating signal input or deactivation signal input;

wherein said central control unit is connected to said air pump, said switching driving device and said air pressure sensor, and said central control unit is adapted to send a driving signal to drive said switching driving device so as to activate the switching between said air passages, and to send an activation signal or a deactivation signal to said air pump according to the internal air pressure value of said inflatable body detected by said air pressure sensor and a pre-set inflating air pressure value so as to activate or deactivate said air pump;

wherein said position signal generating device, when triggered by said switching driving device, generates a position feedback signal and send said position feedback signal to said central control unit, and said central control unit is adapted to send a deactivation signal to said switching driving device to deactivate the switching driving device after said central control unit receives said position feedback signal from said position signal generating device;

wherein said first input unit is further provided with a first inflating signal input, a second inflating signal input, and a third inflating signal input respectively corresponding to three different pre-set inflating air pressure values; and wherein when said central control unit receives an inflating signal sent by one of said first inflating signal input, second inflating signal input, third inflating signal input, and said manual inflating air pressure input and the internal air pressure value of said inflatable body detected by said air pressure sensor is less than the corresponding pre-set inflating air pressure value, said central control unit sends said driving signal to said motor driving unit to drive the air passage switching device to switch to said inflating air passage and sends said activation signal to said air pump to activate said air pump; when the internal air pressure value of said inflatable body detected by said air pressure sensor is greater than the corresponding pre-set inflating air pressure value, said central control unit sends said driving signal to said motor driving unit to drive the air passage switching device to switch to said deflating air passage, so as to deflate the air in the inflatable body to reach the corresponding pre-set inflating air pressure value; and when said central control unit receives said deactivation signal from said deactivation signal input, said central control unit sends said deactivation signal to said motor driving unit to drive the air passage switching device to switch to said closed air passage.

2. The air pump control system of claim 1, wherein said switching driving device further comprises:

a motor driving unit connected to said central control unit; and an air passage switching device connected to said air pump, wherein said central control unit is adapted to send an activation signal to said motor driving unit according to the inflating signal, the deflating signal or the deactivation signal respectively sent by said first input unit, so as to activate the switching between said air passages.

3. The air pump control system of claim 2, wherein said air passages comprise an inflating air passage, a deflating air passage and a closed air passage.

4. The air pump control system of claim 2, wherein said position signal generating device is adapted to send a position feedback signal to said central control unit when said switching driving device is switched to an inflating air passage, a deflating air passage or a closed air passage, respectively, and said central control unit is adapted to send a deactivation signal to said switching driving device according to the received position feedback signal.

5. The air pump control system of claim 1, wherein said switching driving device is an electromagnetic valve, and said central control unit is adapted to send a driving signal to said electromagnetic valve according to said inflating signal, deflating signal or deactivation signal so as to switch said electromagnetic valve to the respective inflating air passage, deflating air passage or closed air passage.

6. The air pump control system of claim 1, wherein said first input unit is further provided with a manual inflating air pressure input for manually setting an inflating air pressure value.

7. The air pump control system of claim 1 further comprising:

a first display unit connected to said central control unit and adapted to receive a display signal generated by said central control unit.

8. The air pump control system of claim 7, wherein said display signal comprises at least one operating state of said air pump control system, said at least one operating state including one or more of an inflating state, a deflating state, a pre-set inflating air pressure value, a pre-set deflating air pressure value, a current air pressure value, a normal operating state, and an abnormal operating state.

9. The air pump control system of claim 1 further comprising:

a first wireless communication module in communication with said central control unit.

10. The air pump control system of claim 9, further comprising:

a mobile terminal provided with a second input unit and a second wireless communication module in communication with said first wireless communication module, said second input unit being adapted to communicate with said central control unit via said second wireless communication module and said first wireless communication module, said second input unit being at least provided with at least one of an inflating signal input, a deflating signal input and a deactivation signal input, and said second input unit being adapted to send an inflating signal, a deflating signal or a deactivation signal to said central control unit respectively via said inflating signal input, deflating signal input or deactivation signal input.

11. The air pump control system of claim 10, wherein said second input unit is further provided with a first inflating signal input, a second inflating signal input, and a third inflating signal input respectively corresponding to three different pre-set inflating air pressure values.

12. The air pump control system of claim 10, wherein said second input unit is further provided with a manual inflating air pressure input for manually setting an inflating air pressure value by said mobile terminal and sending the same to said central control unit.

13. The air pump control system of claim 10, wherein said mobile terminal further comprises a second display unit, which is adapted to communicate with said central control unit via said second wireless communication module and said first wireless communication module and to receive a display signal generated by said central control unit.

14. The air pump control system of claim 10, wherein said first wireless communication module and said second wireless communication module are WIFI modules, Bluetooth modules, infrared modules, second-generation mobile communication modules, third-generation mobile communication modules or fourth-generation mobile communication modules.

15. The air pump control system of claim 1, further comprising:
a functional apparatus connected to said central control unit and adapted to receive a signal for controlling said functional apparatus from said central control unit, wherein said first input unit further comprises a functional apparatus signal input for inputting a functional apparatus signal, and said first input unit is adapted to send the signal for controlling said functional apparatus inputted through said functional apparatus signal input to said central control unit.

16. The air pump control system of claim 13, wherein said second input unit further comprises a functional apparatus signal input.

17. The air pump control system of claim 15, wherein said functional apparatus comprises: a temperature controller and a heating device which are adapted to be mounted on said inflatable body, an external audio apparatus, an external illumination apparatus and/or an external interface.

18. An air pump control method, comprising:
sending an inflating input signal, a deflating input signal or a deactivation input signal to a central control unit;
sending a driving signal to a switching driving device by said central control unit according to said inflating input signal, deflating input signal or deactivation input signal so that said switching driving device drives a switching between two or more air passages;
driving the switching between two or more air passages by said switching driving device, and
sending an activation signal or a deactivation signal to said air pump according to an internal air pressure value of said inflatable body detected by an air pressure sensor and a pre-set inflating air pressure value;
wherein, when said central control unit receives an inflating signal sent by said inflating signal input and when the internal air pressure value of said inflatable body detected by said air pressure sensor is less than the pre-set inflating air pressure value, said central control unit sends said driving signal to said switching driving device so as to drive the air passage switching device to switch to said inflating air passage, and said central control unit also sends said activation signal to said air pump to active said air pump; when the internal air pressure value of said inflatable body detected by said air pressure sensor is greater than the pre-set inflating air pressure value, said central control unit sends said driving signal to said switching driving device to drive the air passage switching device to switch to said deflating air passage, so as to deflate the air in the inflatable body to reach the pre-set inflating air pressure value; and when said central control unit receives said deactivation signal from said deactivation signal input, said central control unit sends said deactivation signal to said motor driving unit to drive the air passage switching device to switch to said closed air passage.

19. The air pump control method of claim 18, wherein at least one position signal generating device is provided on said switching driving device,
wherein the step of driving the switching between two or more air passages by said switching driving device further comprises: triggering said position signal generating device by said switching driving device to generate a position feedback signal, and sending a deactivation signal to said switching driving device by said central control unit to deactivate the switching driving device after said central control unit receives said position feedback signal from said position signal generating device.

20. The air pump control method of claim 18, wherein said switching driving device further comprises: a motor driving unit connected to said central control unit, and an air passage switching device connected to said air pump.

21. The air pump control method of claim 19, wherein said air passages comprises an inflating air passage, a deflating air passage and a closed air passage,
wherein the step of driving the switching between two or more air passages by said switching driving device further comprises: sending a position signal to said central control unit by said position signal generating device when said switching driving device is switched to said inflating air passage, deflating air passage or closed air passage, respectively.

22. The air pump control method of claim 18, wherein the step of sending an inflating input signal, a deflating input signal or a deactivation input signal to a central control unit further comprises: sending the inflating input signal, the deflating input signal or the deactivation input signal to said central control unit via an inflating signal input, a deflating signal input or a deactivation signal input on an input unit.

23. An air pump control system comprising:
an air pump for inflating or deflating an inflatable body;
a switching driving device connected to said air pump and adapted to drive a switching between two or more air passages;
an air pressure sensor for detecting an internal air pressure value of said inflatable body and adapted to generate an internal pressure signal associated with said internal air pressure value and send said internal pressure signal to a central control unit;
a first wireless communication module in communication with said central control unit; and
a mobile terminal provided with a second input unit and a second wireless communication module in communication with said first wireless communication module, said second input unit being adapted to communicate with said central control unit via said second wireless communication module and said first wireless communication module, said second input unit being at least provided with at least one of an inflating signal input, a deflating signal input and a deactivation signal input, and said second input unit being adapted to send an inflating signal, a deflating signal or a deactivation signal to said central control unit respectively via said inflating signal input, deflating signal input or deactivation signal input;
wherein said central control unit is connected to said air pump, said switching driving device and said air pressure sensor, and said central control unit is adapted to send a driving signal to drive said switching driving device so as to activate the switching between said air passages, and to send an activation signal or a deactivation signal to said air pump according to the internal air pressure value of said inflatable body detected by said air pressure sensor and a pre-set inflating air pressure value so as to activate or deactivate said air pump.

24. The air pump control system of claim 23, wherein said second input unit is further provided with a first inflating signal input, a second inflating signal input, and a third inflating signal input respectively corresponding to three different pre-set inflating air pressure values.

25. The air pump control system of claim 23, wherein said second input unit is further provided with a manual inflating air pressure input for manually setting an inflating air pressure value by said mobile terminal and sending the same to said central control unit.

26. The air pump control system of claim 23, wherein said mobile terminal further comprises a second display unit, which is adapted to communicate with said central control unit via said second wireless communication module and said first wireless communication module and to receive a display signal generated by said central control unit.

27. The air pump control system of claim 23, wherein said first wireless communication module and said second wireless communication module are WIFI modules, Bluetooth modules, infrared modules, second-generation mobile communication modules, third-generation mobile communication modules or fourth-generation mobile communication modules.

28. The air pump control system of claim 26, wherein said second input unit further comprises a functional apparatus signal input.

* * * * *